(12) United States Patent
Beyer et al.

(10) Patent No.: US 10,900,782 B2
(45) Date of Patent: Jan. 26, 2021

(54) MAINTENANCE-FREE STRAP-DOWN SHIP'S GYRO COMPASS

(71) Applicant: Raytheon Anschutz GmbH, Kiel (DE)

(72) Inventors: Marc-Andre Beyer, Kiel (DE); Andreas von Cysewski, Kiel (DE); Ulrich Mangold, Kiel (DE); Hendrik Schwab, Kronshagen (DE)

(73) Assignee: Raytheon Anschutz GmbH, Kiel (DE)

( * ) Notice: Subject to any disclaimer, the term of this patent is extended or adjusted under 35 U.S.C. 154(b) by 160 days.

(21) Appl. No.: 16/011,705

(22) Filed: Jun. 19, 2018

(65) Prior Publication Data

US 2018/0364043 A1 Dec. 20, 2018

(30) Foreign Application Priority Data

Jun. 19, 2017 (DE) .......................... 10 2017 113 337

(51) Int. Cl.
*G01C 19/38* (2006.01)
*G01C 25/00* (2006.01)
*G01C 21/16* (2006.01)

(52) U.S. Cl.
CPC ........... *G01C 19/38* (2013.01); *G01C 21/165* (2013.01); *G01C 25/005* (2013.01)

(58) Field of Classification Search
CPC .................................................. G01C 19/38
(Continued)

(56) References Cited

U.S. PATENT DOCUMENTS

| 4,530,164 A * | 7/1985 | Barriac | G01C 19/38 33/324 |
| 6,853,947 B1 * | 2/2005 | Horton | G01C 21/16 702/150 |

(Continued)

FOREIGN PATENT DOCUMENTS

| CN | 106123917 | 11/2016 |
| WO | 2013/139486 | 9/2013 |

OTHER PUBLICATIONS

Li et al., "A novel algorithm for marine strapdown gyrocompass based on digital filter", ScienceDirect, vol. 46. No. 1, pp. 563-571, 2013.

(Continued)

*Primary Examiner* — Christopher W Fulton
(74) *Attorney, Agent, or Firm* — Diederiks & Whitelaw, PLC.

(57) ABSTRACT

Method for operation of a strap-down ship's gyro compass for optimal calculation of position and course angle on a ship, with three rotational rate sensors each mutually aligned to each other at a right angle, and two nominally horizontally aligned orthogonal acceleration sensors, without required specification of the geographic latitude and/or of the speed of the ship, characterized by the steps: a. Preparation of a set of dynamic equations based on the angular velocity components detected by the rotational rate sensor, b. Preparation of a measured data equation based on the force components detected by the acceleration sensors, c. Determination of the properties of the lever arm between the strap-down ship's gyro compass and the point of rotation of the ship, and d. Determination of the properties of the earth's rotation and of the ship's angular velocity, wherein their properties are determined on the basis of the set of dynamic equations and the measured data equation, and are used in each case as (Continued)

parameters for calculation of the geographic latitude and/or speed of the ship.

10 Claims, 1 Drawing Sheet

(58) Field of Classification Search
USPC .......................................................... 33/301
See application file for complete search history.

(56) References Cited

U.S. PATENT DOCUMENTS

| | | | | |
|---|---|---|---|---|
| 7,216,055 | B1* | 5/2007 | Horton | G01C 21/16 702/150 |
| 8,768,647 | B1* | 7/2014 | Zaki | G01C 21/16 702/150 |
| 2005/0240347 | A1* | 10/2005 | Yang | G01C 21/16 701/500 |
| 2007/0282565 | A1* | 12/2007 | Bye | G01C 21/206 702/158 |
| 2009/0089001 | A1* | 4/2009 | Lin | G01C 21/16 702/92 |
| 2010/0251557 | A1* | 10/2010 | Albo | F41G 3/02 33/318 |
| 2011/0307213 | A1* | 12/2011 | Zhao | G06F 1/1626 702/153 |

OTHER PUBLICATIONS

Liu et al., "A novel self-alignment method for SINS based on three vectors of gravitational apparent motion in inertial frame", ScienceDirect, vol. 62, pp. 47-62, 2015.

Liu et al., "A Self-Alignment Algorithm for SINS Based on Gravitational Apparent Motion and Sensor Data Denoising", Sensors, vol. 15, pp. 9827-9853, 2015.

Xu et al., "Error Analysis and Compensation of Gyrocompass Alignment for SINS on Moving Base", Mathematical Problems in Engineering, vol. 2015, pp. 1-18, 2014.

* cited by examiner

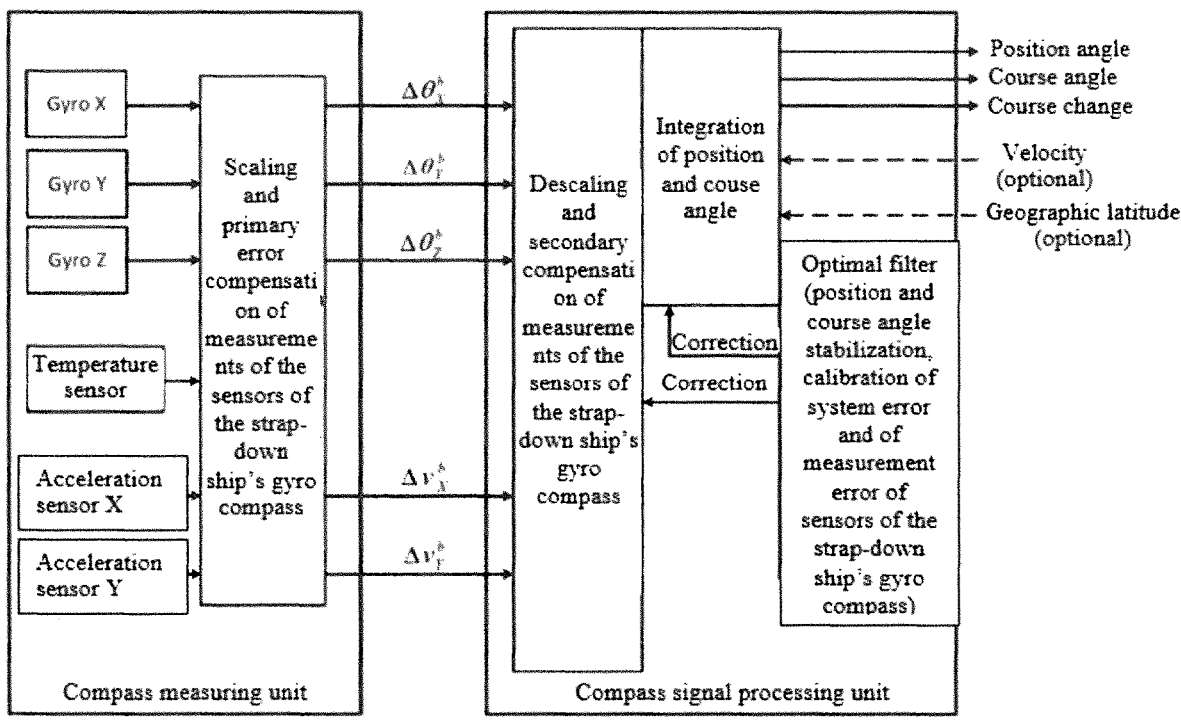

MAINTENANCE-FREE STRAP-DOWN SHIP'S GYRO COMPASS

BACKGROUND OF THE INVENTION

The invention relates to a strap-down ship's gyro compass. In particular, the invention relates to a method for operation of a strap-down ship's gyro compass on a ship, with three rotational rate sensors, each mutually aligned to each other at a right angle, and two nominally horizontally aligned orthogonal acceleration sensors.

Conventional strap-down ship's gyro compasses necessarily require for their operation the specification of the ship's known position and the ship's velocity.

The disadvantage of this process is that compasses of this kind, after a system failure, will not be immediately available again.

BRIEF SUMMARY OF THE INVENTION

Thus the object of the invention is to provide a method for operation of a strap-down ship's gyro compass, in particular a method for calculation of position and course, by means of a strap-down ship's gyro compass which is continuously available, highly accurate and exceptionally reliable.

This object is achieved according to the invention by the method with the features described below.

Initially the present invention proceeds from a strap-down system with sensors hard-mounted on the ship, that is, three strap-down ship's gyro compasses each mutually aligned to each other at a right angle, and also two nominally horizontally aligned orthogonal acceleration sensors. The standard third, nominally vertical acceleration sensor is not needed for a compass application in which no position integration is required. Modeling of the earth's gravity as a function of the geographic latitude is likewise not necessary; an average, constant value is sufficient with regard to the required accuracy.

All compass systems available on the market today necessarily require at system start the input of the geographic latitude and also the ship's velocity. Otherwise these systems cannot find and hold the North direction in the interval [0°, 360°]. Now whereas the ship's velocity can be determined reliably and with sufficient accuracy by the onboard autonomous Log, the geographic latitude in the vast majority of cases is obtained from a GPS single-frequency receiver. These receivers rely on weak signals from space and are highly susceptible to intentional and also to unintentional interference (jamming), and especially to deception signals (spoofing). The present invention leaves unresolved the sources for the velocity and geographic latitude. The latter can also be determined astronomically with sufficient accuracy and frequency.

Thus the present invention has two primary goals for all realistic circumstances of ship movement and conditions at sea:

1. Finding and holding (retaining) the North direction with only the information from the three rotational rate sensors and two acceleration sensors, i.e. without any external information.
2. If external position information, and also velocity information are available, then not only is the North direction found and retained, but also the rotational rate sensors calibrated during the mission, in order to increase the course accuracy and compensate for aging effects of the rotational rate sensors.

Thus according to the invention, a method is provided for operation of a strap-down ship's gyro compass for optimal calculation of position and course angle on a ship, with three rotational rate sensors each mutually aligned to each other at a right angle, and two nominally horizontally aligned orthogonal acceleration sensors, without required specification of the geographic latitude and/or of the speed of the ship, with the steps: a. Preparation of a set of dynamic equations based on the angular velocity components detected by the rotational rate sensor, b. Preparation of a measured data equation based on the force components detected by the acceleration sensors, c. Determination of the properties of the lever arm between the strap-down ship's gyro compass and the point of rotation of the ship, and d. Determination of the properties of the earth's rotation and of the ship's angular velocity, wherein their properties are determined on the basis of the set of dynamic equations and the measured data equation, and are used in each case as parameters for calculation of the geographic latitude and/or speed of the ship.

Preferably the dynamic equation has the general form:

$$\underline{C}_{nb}(\phi, \theta, \psi) = \underline{R}_3(-\psi) \cdot \underline{R}_2(-\theta) \cdot \underline{R}_1(-\phi)$$

$$= \begin{pmatrix} c\theta \cdot c\psi & s\phi \cdot s\theta \cdot c\psi - c\phi \cdot s\psi & c\phi \cdot s\theta \cdot c\psi + s\phi \cdot s\psi \\ c\theta \cdot s\psi & s\phi \cdot s\theta \cdot s\psi + c\phi \cdot c\psi & c\phi \cdot s\theta \cdot s\psi - s\phi \cdot c\psi \\ -s\theta & s\phi \cdot c\theta & c\phi \cdot c\theta \end{pmatrix}$$

However, the measured data equation is preferably:

$$\underline{f}^b + \delta \underline{f}^b = \underline{\dot{v}}^b - \underline{C}_{nb}^T \cdot \underline{g}^n$$

with $$\underline{C}_{nb}(\phi, \theta, \psi) = \underline{R}_3(-\psi) \cdot \underline{R}_2(-\theta) \cdot \underline{R}_1(-\phi)$$

$$= \begin{pmatrix} c\theta \cdot c\psi & s\phi \cdot s\theta \cdot c\psi - c\phi \cdot s\psi & c\phi \cdot s\theta \cdot c\psi + s\phi \cdot s\psi \\ c\theta \cdot s\psi & s\phi \cdot s\theta \cdot s\psi + c\phi \cdot c\psi & c\phi \cdot s\theta \cdot s\psi - s\phi \cdot c\psi \\ -s\theta & s\phi \cdot c\theta & c\phi \cdot c\theta \end{pmatrix}$$

wherein:
- $\underline{C}_{nb}$ corresponds to the transformation matrix with the roll, pitch and course angle of the compass,
- $\underline{\Omega}_{ib}^b$ corresponds to the components of angular velocity measured by the three rotational rate sensors,
- $\underline{\Omega}_{ie}^n$ corresponds to the earth's rotational rate components in the North-East-lower reference system as functions of the geographic latitude,
- $\underline{\Omega}_{en}^n$ corresponds to the ship's angular velocity components in the North-East lower reference system as functions of the compass velocity vector on the earth's curved surface
- $\delta\underline{\Omega}_{ib}^b, \delta\underline{f}^b$ corresponds to the error corrections of the rotational rate sensor and acceleration sensors,
- $\underline{f}^b$ corresponds to the force components measured by the acceleration sensors arranged nominally horizontal and orthogonal, and
- $\underline{g}^n$ corresponds to the earth's gravity as $\underline{g}^n = (0\ 0\ g)^T$.

According to an additional, preferred embodiment, the error corrections of the rotational rate sensors and acceleration sensors are determined by means of an optimum filter on the basis of a subset of the prepared set of dynamic equations.

BRIEF DESCRIPTION OF THE DRAWING

FIG. 1 shows a schematic overview of the components of a strap-down ship's gyro compass designed according to the invention.

DETAILED DESCRIPTION OF THE PREFERED EMBODIMENTS

FIG. 1 shows a schematic overview of the components of a strap-down ship's gyro compass designed according to the invention, with a compass measuring unit, a compass signal processing unit and the parameters obtained and/or processed by the two units.

The invention will be explained in greater detail below based on particularly preferred design embodiments:
Estimation of the Lever Arm The non-linear system dynamics are reflected by the following dynamic equation:

$$\underline{\dot{C}}_{nb} = \underline{C}_{nb} \cdot \underline{\Omega}^b_{nb} = \underline{C}_{nb} \cdot (\underline{\Omega}^b_{ib} + \delta\underline{\Omega}^b_{ib}) - (\underline{\Omega}^n_{en} + \underline{\Omega}^n_{ie}) \cdot \underline{C}_{nb}$$

The non-linear measured data equation is as follows:

$$\underline{f}^b + \delta \underline{f}^b = \underline{v}^b - \underline{C}_{nb}^T \cdot \underline{g}^n$$

with $$\underline{C}_{nb}(\phi, \theta, \psi) = \underline{R}_3(-\psi) \cdot \underline{R}_2(-\theta) \cdot \underline{R}_1(-\phi)$$

$$= \begin{pmatrix} c\theta \cdot c\psi & s\phi \cdot s\theta \cdot c\psi - c\phi \cdot s\psi & c\phi \cdot s\theta \cdot c\psi + s\phi \cdot s\psi \\ c\theta \cdot s\psi & s\phi \cdot s\theta \cdot s\psi + c\phi \cdot c\psi & c\phi \cdot s\theta \cdot s\psi - s\phi \cdot c\psi \\ -s\theta & s\phi \cdot c\theta & c\phi \cdot c\theta \end{pmatrix}$$

wherein:
$\underline{C}_{nb}$ corresponds to the transformation matrix with the roll, pitch and course angle of the compass,
$\underline{\Omega}^b_{ib}$ corresponds to the components of angular velocity measured by the three rotational rate sensors,
$\underline{\Omega}^n_{ie}$ corresponds to the earth's rotational rate components in the North-East-lower reference system as functions of the geographic latitude,
$\underline{\Omega}^n_{en}$ corresponds to the ship's angular velocity components in the North-East lower reference system as functions of the compass velocity vector on the earth's curved surface,
$\delta\underline{\Omega}^b_{ib}, \delta\underline{f}^b$ corresponds to the error corrections of the rotational rate sensor and acceleration sensors,
$\underline{f}^b$ corresponds to the force components measured by the acceleration sensors arranged nominally horizontal and orthogonal, and
$\underline{g}^n$ corresponds to the earth's gravity as $\underline{g}^n = (0\ 0\ g)^T$.

It should be noted that $\underline{\Omega}^b_{ib}, \underline{\Omega}^n_{ie}, \underline{\Omega}^n_{en}$ and $\delta\underline{\Omega}^b_{ib}$ are skew-symmetrical matrices which are each formed from the vectors $\underline{\Omega}^b_{ib}, \underline{\Omega}^n_{ie}, \underline{\Omega}^n_{en}$ and $\delta\underline{\Omega}^b_{ib}$.

Also applying are $\underline{\omega}^n_{ie} \equiv (\omega_N\ \omega_E\ \omega_D)^T = \Omega \cdot (\cos \varphi\ 0\ -\sin \varphi)^T$, wherein $\Omega$ represents the angular velocity of the earth, y represents the geographic latitude and $$\omega^n_{en} \equiv (\rho_N\ \rho_E\ \rho_D)^T = \frac{1}{R} \cdot (v_E\ -v_N\ -v_E \cdot \tan \varphi)^T,$$

wherein R, $v_N$ and $v_E$ represent the radius of the earth and the North and East velocity components.

Now in order to increase the availability, accuracy and operating reliability of the strap-down ship's gyro compass, in particular in rough seas, an additional estimation of the lever arm components is performed, wherein the specific force measurements $f_X^b$ and $f_Y^b$ are corrected by:
deviations in the acceleration sensors $b_X^b$ and $b_Y^b$ estimated by means of optimal filter;
lever arm components $l_X^v$, $l_Y^v$ and $l_Z^v$, estimated by means of optimal filter, that is, their resulting centrifugal and rotational accelerations
ship longitudinal acceleration effects $\hat{a}_X^v$, estimated by means of velocity filter, and
ship longitudinal velocity $\hat{v}_X^v$, and/or Coriolis acceleration effects resulting therefrom, as estimated by means of velocity filter.

The difference between the corrected specific force measurements and the scaled gravity vector, that is, $((C_{n/\tilde{n}b})_{3,1}\ (C_{n/\tilde{n}b})_{3,2})^T$, is called the residual vector and is formed as a function of the corrections of the deviations in the acceleration sensor and the lever arm components estimated by means of optimal filter, and also of the roll and pitch angle error corrections $\delta\phi$ and $\delta\theta$, which are expressed as corrections of the pitch angle errors $\varepsilon_{N/\tilde{N}}$ and $\varepsilon_{E/\tilde{E}}$, in conformance with the definitions $\underline{E}^n \equiv \delta \underline{C}_{nb} \cdot \underline{C}_{\tilde{n}b}^T$ and $$\underline{E}^n \equiv \begin{pmatrix} 0 & -\varepsilon_D & \varepsilon_{E/\tilde{E}} \\ \varepsilon_D & 0 & -\varepsilon_{N/\tilde{N}} \\ -\varepsilon_{E/\tilde{E}} & \varepsilon_{N/\tilde{N}} & 0 \end{pmatrix}$$

N, E and D denote the North, East and vertically downward direction, wherein $\tilde{N}$ and $\tilde{E}$ denote the unknown, initial orientation of the strap-down ship's gyro compass during the rough alignment phase.
$(C_{vb})_{i,j}$ denotes the element in line i and column j of the transformation matrix from the compass coordinate system b into the ship coordinate system v, with axes of the v-coordinate system pointing:
toward the bow, along the longitudinal axis of the ship
to starboard along the transverse axis of the ship, and
toward the hull along the normal axis of the ship.

The constancy matrix $\underline{C}_{vb}$ is determined during compass installation on the ship by referencing the azimuth of the pier. Note that $\underline{C}_{nv} = \underline{C}_{nb} \cdot \underline{C}_{vb}^T$ with the identity $\underline{C}_{nv}(\phi_v, \theta_v, \psi_v) = \underline{R}_3(-\psi_v) \cdot \underline{R}_2(-\theta_v) \cdot \underline{R}_1(-\phi_v)$, contains the ship roll, pitch and course angles.

$(\hat{\omega}^b_{ib})_X$, $(\hat{\omega}^b_{ib})_Y$, $(\hat{\omega}^b_{ib})_Z$ and $\hat{f}_X^b$, $\hat{f}_Y^b$ are determined from the usually measured increases in angle and velocity $\Delta\theta_X^b$, $\Delta\theta_Y^b$, $\Delta\theta_Z^b$ and $\Delta v_X^b$, $\Delta v_Y^b$ by means of suitable deep pass filtering. The initial values of the lever arm components $l_X^v$, $l_Y^v$ and $l_Z^v$, are set to 0.

$$\frac{1}{g} \cdot \begin{pmatrix} \hat{f}_X^b \\ \hat{f}_Y^b \end{pmatrix} + \frac{1}{g} \cdot \begin{pmatrix} b_X^b \\ b_Y^b \end{pmatrix} - \frac{1}{g} \begin{pmatrix} (C_{vb})_{1,1} \\ (C_{vb})_{1,2} \end{pmatrix} \cdot \hat{a}_X^v +$$

$$\frac{1}{g} \cdot \begin{pmatrix} (C_{vb})_{1,2} \cdot (\hat{\omega}^b_{ib})_Z - (C_{vb})_{1,3} \cdot (\hat{\omega}^b_{ib})_Y \\ (C_{vb})_{1,3} \cdot (\hat{\omega}^b_{ib})_X - (C_{vb})_{1,1} \cdot (\hat{\omega}^b_{ib})_Z \end{pmatrix} \cdot v_X^v +$$

$$\frac{1}{g} \cdot \begin{pmatrix} \begin{pmatrix} -(\hat{\omega}^b_{ib})_Y^2 - (\hat{\omega}^b_{ib})_Z^2 \\ (\hat{\omega}^b_{ib})_X \cdot (\hat{\omega}^b_{ib})_Y - (\hat{\omega}^b_{ib})_Z \\ (\hat{\omega}^b_{ib})_X \cdot (\hat{\omega}^b_{ib})_Z + (\hat{\omega}^b_{ib})_Y \end{pmatrix}^T \\ \begin{pmatrix} (\hat{\omega}^b_{ib})_X \cdot (\hat{\omega}^b_{ib})_Y - (\hat{\omega}^b_{ib})_Z \\ -(\hat{\omega}^b_{ib})_X^2 - (\hat{\omega}^b_{ib})_Z^2 \\ (\hat{\omega}^b_{ib})_Y \cdot (\hat{\omega}^b_{ib})_Z - (\hat{\omega}^b_{ib})_X \end{pmatrix}^T \end{pmatrix} \cdot \underline{C}_{vb}^T \begin{pmatrix} l_X^v \\ l_Y^v \\ l_Z^v \end{pmatrix} + \begin{pmatrix} (C_{n/\tilde{n}b})_{3,1} \\ (C_{n/\tilde{n}b})_{3,2} \end{pmatrix} \equiv$$

$$(r_X^b\ r_Y^b)^T = \begin{pmatrix} -(C_{n/\tilde{n}b})_{2,1} & -(C_{n/\tilde{n}b})_{1,1} & -\frac{1}{g} & 0 \\ -(C_{n/\tilde{n}b})_{2,2} & -(C_{n/\tilde{n}b})_{1,2} & 0 & -\frac{1}{g} \end{pmatrix} -$$

$$\frac{1}{g}\begin{pmatrix} \begin{pmatrix} -(\hat{\omega}_{ib}^b)_Y^2 - (\hat{\omega}_{ib}^b)_Z^2 \\ (\hat{\omega}_{ib}^b)_X \cdot (\hat{\omega}_{ib}^b)_Y - (\hat{\omega}_{ib}^b)_Z \\ (\hat{\omega}_{ib}^b)_X \cdot (\hat{\omega}_{ib}^b)_Z - (\hat{\omega}_{ib}^b)_Y \end{pmatrix}^T \\ \begin{pmatrix} (\hat{\omega}_{ib}^b)_X \cdot (\hat{\omega}_{ib}^b)_Y - (\hat{\omega}_{ib}^b)_Z \\ -(\hat{\omega}_{ib}^b)_X^2 - (\hat{\omega}_{ib}^b)_Z^2 \\ (\hat{\omega}_{ib}^b)_Y \cdot (\hat{\omega}_{ib}^b)_Z - (\hat{\omega}_{ib}^b)_X \end{pmatrix}^T \end{pmatrix} \cdot \underline{C}_{vb}^T \cdot \begin{pmatrix} \varepsilon_{N/\tilde{N}} \\ \varepsilon_{E/\tilde{E}} \\ \delta b_X^b \\ \delta b_Y^b \\ \delta l_X^v \\ \delta l_Y^v \\ \delta l_Z^v \end{pmatrix}$$

Estimation of the Earth's and Ship's Angular Velocity Components

If the geographic latitude and ship velocity are not available, then the state vector is reproduced as follows:

$\underline{x} = (\varepsilon_{\tilde{N}} \varepsilon_{\tilde{E}} \varepsilon_D \delta d_{\tilde{N}} \delta d_{\tilde{E}} \delta d_D \delta b_X^b \delta b_Y^b \delta l_X^v \delta l_Y^v \delta l_Z^v)^T$ The dynamic matrix appears as follows:

$$\underline{F} = \begin{pmatrix} \begin{pmatrix} 0 & \omega_D & -\omega_{\tilde{E}} & 1 & 0 & 0 \\ -\omega_D & 0 & \omega_{\tilde{N}} & 0 & 1 & 0 \\ \omega_{\tilde{E}} & -\omega_{\tilde{N}} & 0 & 0 & 0 & 1 \\ 0 & 0 & 0 & -\beta_{d\tilde{n}} & 0 & 0 \\ 0 & 0 & 0 & 0 & -\beta_{d\tilde{n}} & 0 \\ 0 & 0 & 0 & 0 & 0 & -\beta_{d\tilde{n}} \end{pmatrix} & \underline{0}_{6\times 2} & \underline{0}_{6\times 3} \\ \underline{0}_{2\times 6} & \text{diag}\begin{pmatrix} -\beta_{b_X^b} \\ -\beta_{b_Y^b} \end{pmatrix} & \underline{0}_{2\times 3} \\ \underline{0}_{3\times 6} & \underline{0}_{3\times 2} & \text{diag}\begin{pmatrix} -\beta_{l_X^v} \\ -\beta_{l_Y^v} \\ -\beta_{l_Z^v} \end{pmatrix} \end{pmatrix}$$

In this case we have $\omega_{\tilde{N}} \equiv \Omega \cdot \cos\varphi \cdot \cos\alpha = -d_{\tilde{N}}$, $\omega_{\tilde{E}} \equiv -\Omega \cdot \cos\varphi \cdot \sin\alpha = -d_{\tilde{E}}$ and $\omega_D \equiv -\Omega \cdot \sin\varphi = -d_D$.

Therefore, $\alpha \equiv a\tan 2\,(-d_{\tilde{E}}, -d_{\tilde{N}})$,

After $\alpha$ has been calculated to a significant figure, the compass will operate with the actual N-E-D reference coordinate system, that is, the compass has entered into the operating mode and the correction model for the state vector is:

$\underline{x} = (\varepsilon_N \varepsilon_E \varepsilon_D \delta d_N \delta d_C \delta d_D \delta b_X^b \delta b_Y^b \delta l_X^v \delta l_Y^v \delta l_Z^v)^T$ and the dynamic matrix is:

$$\underline{F} = \begin{pmatrix} \begin{pmatrix} 0 & \omega_D & -\omega_E \\ -\omega_D & 0 & \omega_N \\ \omega_E & -\omega_N & 0 \end{pmatrix} & \begin{pmatrix} 1 & \cos\theta_v \cdot \sin\psi_v & 0 \\ 0 & -\cos\theta_v \cdot \cos\psi_v & 0 \\ -\frac{d_C \cdot d_D}{d_N^2} \cdot \cos\theta_v \cdot \sin\psi_v & \frac{d_D}{d_N} \cdot \cos\theta_v \cdot \sin\psi_v & 1 + \frac{d_C}{d_N} \cdot \cos\theta_v \cdot \sin\psi_v \end{pmatrix} & \underline{0}_{3\times 2} & \underline{0}_{3\times 3} \\ \underline{0}_{3\times 3} & \text{diag}\begin{pmatrix} -\beta_{d_X^b} \\ -\beta_{d_Y^b} \\ -\beta_{d_Z^b} \end{pmatrix} & \underline{0}_{3\times 2} & \underline{0}_{3\times 3} \\ \underline{0}_{2\times 3} & \underline{0}_{2\times 3} & \text{diag}\begin{pmatrix} -\beta_{b_X^b} \\ -\beta_{b_Y^b} \end{pmatrix} & \underline{0}_{2\times 3} \\ \underline{0}_{3\times 3} & \underline{0}_{3\times 3} & \underline{0}_{3\times 2} & \text{diag}\begin{pmatrix} -\beta_{l_X^v} \\ -\beta_{l_Y^v} \\ -\beta_{l_Z^v} \end{pmatrix} \end{pmatrix}$$

wherein $$\omega_N = -d_N - d_C \cdot \cos\theta_v \cdot \sin\psi_v$$

$$\omega_E = d_C \cdot \cos\theta_v \cdot \cos\psi_v$$

$$\omega_D = -d_D - \frac{d_C \cdot d_D}{d_N} \cdot \cos\theta_v \cdot \sin\psi_v$$

and $$d_C = -\frac{v_X^v}{R}.$$

Calibration of Deviation of Angular Velocity Sensor

If the geographic latitude and the ship's velocity are provided, then the components of the earth's and ship's angular velocity can be calculated, and thus the measured angular velocity can be corrected; also their sensor-induced errors can be estimated and/or calibrated. The much smaller deviations in the rotational rate sensors during compass operation are corrected by application of the following state vector:

$$\underline{x} = (\varepsilon_N \varepsilon_E \varepsilon_D \delta d_X^b \delta d_Y^b \delta d_Z^b \delta b_X^b \delta b_Y^b \delta l_X^v \delta l_Y^v \delta l_Z^v)^T$$

and the dynamic matrix reproduced below:

$$\underline{F} = \begin{pmatrix} \begin{pmatrix} 0 & \omega_D & -\omega_E \\ -\omega_D & 0 & \omega_N \\ \omega_E & -\omega_N & 0 \end{pmatrix} & \underline{C}_{nb} & \underline{0}_{3\times 2} & \underline{0}_{3\times 3} \\ \underline{0}_{3\times 3} & \operatorname{diag}\begin{pmatrix} -\beta_{d_X^b} \\ -\beta_{d_Y^b} \\ -\beta_{d_Z^b} \end{pmatrix} & \underline{0}_{3\times 2} & \underline{0}_{3\times 3} \\ \underline{0}_{2\times 3} & \underline{0}_{2\times 3} & \operatorname{diag}\begin{pmatrix} -\beta_{b_X^b} \\ -\beta_{b_Y^b} \end{pmatrix} & \underline{0}_{2\times 3} \\ \underline{0}_{3\times 3} & \underline{0}_{3\times 3} & \underline{0}_{3\times 2} & \operatorname{diag}\begin{pmatrix} -\beta_{l_X^v} \\ -\beta_{l_Y^v} \\ -\beta_{l_Z^v} \end{pmatrix} \end{pmatrix}$$

Fast and Rough Tuning

If the geographic latitude is known, then a faster and more reliable calculation of $\alpha$ can be performed from the estimated horizontal components of the earth's angular velocity.

The state vector is as follows:

$$\underline{x} = (\varepsilon_{\tilde{N}} \varepsilon_E \varepsilon_D \delta d_{\tilde{N}} \delta d_{\tilde{E}} \delta b_X^b \delta b_Y^b \delta l_X^v \delta l_Y^v \delta l_Z^v)^T$$

The dynamic matrix is as follows:

$$\underline{F} = \begin{pmatrix} \begin{pmatrix} 0 & \omega_D & -\omega_{\tilde{E}} & 1 & 0 \\ -\omega_D & 0 & \omega_{\tilde{N}} & 0 & 1 \\ \omega_{\tilde{E}} & -\omega_{\tilde{N}} & 0 & 0 & 0 \\ 0 & 0 & 0 & -\beta_{d^n} & 0 \\ 0 & 0 & 0 & 0 & -\beta_{d^n} \end{pmatrix} & \underline{0}_{5\times 2} & \underline{0}_{5\times 3} \\ \underline{0}_{2\times 5} & \operatorname{diag}\begin{pmatrix} -\beta_{b_X^b} \\ -\beta_{b_Y^b} \end{pmatrix} & \underline{0}_{2\times 3} \\ \underline{0}_{3\times 5} & \underline{0}_{3\times 2} & \operatorname{diag}\begin{pmatrix} -\beta_{l_X^v} \\ -\beta_{l_Y^v} \\ -\beta_{l_Z^v} \end{pmatrix} \end{pmatrix}$$

with $\omega_{\tilde{N}} \equiv \Omega \cdot \cos\varphi \cdot \cos\alpha = -d_{\tilde{N}}$, $\omega_{\tilde{E}} \equiv -\Omega \cdot \cos\varphi \cdot \sin\alpha = -d_{\tilde{E}}$ and $\omega_D \equiv -\Omega \cdot \sin\varphi$, so that $\alpha \equiv a\tan 2\, (-d_{\tilde{E}}, -d_{\tilde{N}})$.

To ensure that the compass measuring unit is suitable only for the strap-down ship's gyro compass, its measured increases in angle and velocity are scaled to a lesser accuracy than can be used for a gyro compass. When the scaled increment is received by the compass signal processing unit, the increments are descaled before their subsequent use within the strap-down compass signal processing path and corrected as described above.

The invention claimed is:

1. A method for operation of a strap-down ship's gyro compass for optimal calculation of position and course angle on a ship, with three rotational rate sensors each mutually aligned to each other at a right angle, and two nominally horizontally aligned orthogonal acceleration sensors, without required specification of the geographic latitude and/or of the speed of the ship, said method comprising:
   a. preparing a set of dynamic equations based on the angular velocity components detected by the rotational rate sensors,
   b. preparing of a measured data equation based on the force components detected by the acceleration sensors,
   c. determining the properties of a lever arm between the strap-down ship's gyro compass and the point of rotation of the ship, and
   d. determining the properties of the earth's rotation and of the ship's angular velocity, wherein their properties are determined on the basis of the set of dynamic equations and the measured data equation and are used in each case as parameters for calculation of the geographic latitude and/or speed of the ship.

2. The method according to claim 1, wherein the error corrections of the acceleration sensors are determined by an optimal filter on the basis of an expanded state-space representation.

3. The method according to claim 2, wherein the error corrections of the rotational rate sensors are determined by the optimal filter on the basis of an expanded state-space representation.

4. A method for operation of a strap-down ship's gyro compass for optimal calculation of position and course angle on a ship, with three rotational rate sensors each mutually aligned to each other at a right angle, and two nominally horizontally aligned orthogonal acceleration sensors, without required specification of the geographic latitude and/or of the speed of the ship, said method comprising:
   a. preparing a set of dynamic equations based on the angular velocity components detected by the rotational rate sensors,
   b. preparing of a measured data equation based on the force components detected by the acceleration sensors,
   c. determining the properties of a lever arm between the strap-down ship's gyro compass and the point of rotation of the ship, and
   d. determining the properties of the earth's rotation and of the ship's angular velocity, wherein their properties are determined on the basis of the set of dynamic equations and the measured data equation and are used in each case as parameters for calculation of the geographic latitude and/or speed of the ship, wherein the set of dynamic equations includes one equation that reads as follows:

$$\underline{\dot{C}}_{nb} = \underline{C}_{nb} \cdot \underline{\Omega}_{nb}^b = \underline{C}_{nb} \cdot (\underline{\Omega}_{ib}^b + \delta\underline{\Omega}_{ib}^b) - (\underline{\Omega}_{en}^n + \underline{\Omega}_{ie}^n) \cdot \underline{C}_{nb}.$$

5. The method according to claim 4, wherein the measured data equation reads as follows:

$\underline{f}^b + \delta \underline{f}^b = \underline{\dot{v}}^b - \underline{C}_{nb}^T \cdot \underline{g}^n$ with $$\underline{C}_{nb}(\phi, \theta, \psi) = \underline{R}_3(-\psi) \cdot \underline{R}_2(-\theta) \cdot \underline{R}_1(-\phi)$$

$$= \begin{pmatrix} c\theta \cdot c\psi & s\phi \cdot s\theta \cdot c\psi - c\phi \cdot s\psi & c\phi \cdot s\theta \cdot c\psi + s\phi \cdot s\psi \\ c\theta \cdot s\psi & s\phi \cdot s\theta \cdot s\psi + c\phi \cdot c\psi & c\phi \cdot s\theta \cdot s\psi - s\phi \cdot c\psi \\ -s\theta & s\phi \cdot c\theta & c\phi \cdot c\theta \end{pmatrix}$$

wherein:
- $\underline{C}_{nb}$ corresponds to the transformation matrix with the roll, pitch and course angle of the compass,
- $\underline{\Omega}_{ib}^b$ corresponds to the components of angular velocity measured by the three rotational rate sensors,
- $\underline{\Omega}_{ie}^n$ corresponds to the earth's rotational rate components in the North-East-lower reference system as functions of the geographic latitude,
- $\underline{\Omega}_{en}^n$ corresponds to the ship's angular velocity components in the North-East lower reference system as functions of the compass velocity vector on the earth's curved surface,
- $\delta\underline{\Omega}_{ib}^b, \delta\underline{f}^b$ corresponds to the error corrections of the rotational rate sensor and acceleration sensors,
- $\underline{f}^b$ corresponds to the force components measured by the acceleration sensors arranged nominally horizontal and orthogonal, and
- $\underline{g}^n$ corresponds to the earth's gravity as $\underline{g}^n = (0\ 0\ g)^T$.

6. The method according to claim 4, wherein the error corrections of the acceleration sensors are determined by an optimal filter on the basis of an expanded state-space representation.

7. The method according to claim 6, wherein the error corrections of the rotational rate sensors are determined by the optimal filter on the basis of an expanded state-space representation.

8. A method for operation of a strap-down ship's gyro compass for optimal calculation of position and course angle on a ship, with three rotational rate sensors each mutually aligned to each other at a right angle, and two nominally horizontally aligned orthogonal acceleration sensors, without required specification of the geographic latitude and/or of the speed of the ship, said method comprising:
   a. preparing a set of dynamic equations based on the angular velocity components detected by the rotational rate sensors,
   b. preparing of a measured data equation based on the force components detected by the acceleration sensors,
   c. determining the properties of a lever arm between the strap-down ship's gyro compass and the point of rotation of the ship, and
   d. determining the properties of the earth's rotation and of the ship's angular velocity, wherein their properties are determined on the basis of the set of dynamic equations and the measured data equation and are used in each case as parameters for calculation of the geographic latitude and/or speed of the ship, wherein the measured data equation reads as follows:

$\underline{f}^b + \delta \underline{f}^b = \underline{\dot{v}}^b - \underline{C}_{nb}^T \cdot \underline{g}^n$ with $$\underline{C}_{nb}(\phi, \theta, \psi) = \underline{R}_3(-\psi) \cdot \underline{R}_2(-\theta) \cdot \underline{R}_1(-\phi)$$

$$= \begin{pmatrix} c\theta \cdot c\psi & s\phi \cdot s\theta \cdot c\psi - c\phi \cdot s\psi & c\phi \cdot s\theta \cdot c\psi + s\phi \cdot s\psi \\ c\theta \cdot s\psi & s\phi \cdot s\theta \cdot s\psi + c\phi \cdot c\psi & c\phi \cdot s\theta \cdot s\psi - s\phi \cdot c\psi \\ -s\theta & s\phi \cdot c\theta & c\phi \cdot c\theta \end{pmatrix}$$

wherein:
- $\underline{C}_{nb}$ corresponds to the transformation matrix with the roll, pitch and course angle of the compass,
- $\underline{\Omega}_{ib}^b$ corresponds to the components of angular velocity measured by the three rotational rate sensors,
- $\underline{\Omega}_{ie}^n$ corresponds to the earth's rotational rate components in the North-East-lower reference system as functions of the geographic latitude,
- $\underline{\Omega}_{en}^n$ corresponds to the ship's angular velocity components in the North-East lower reference system as functions of the compass velocity vector on the earth's curved surface,
- $\delta\underline{\Omega}_{ib}^b, \delta\underline{f}^b$ corresponds to the error corrections of the rotational rate sensor and acceleration sensors,
- $\underline{f}^b$ corresponds to the force components measured by the acceleration sensors arranged nominally horizontal and orthogonal, and
- $\underline{g}^n$ corresponds to the earth's gravity as $\underline{g}^n = (0\ 0\ g)^T$.

9. The method according to claim 8, wherein the error corrections of the acceleration sensors are determined by an optimal filter on the basis of an expanded state-space representation.

10. The method according to claim 9, wherein the error corrections of the rotational rate sensors are determined by the optimal filter on the basis of an expanded state-space representation.

* * * * *